(12) United States Patent
Murray Herrera et al.

(10) Patent No.: US 8,515,201 B1
(45) Date of Patent: Aug. 20, 2013

(54) SYSTEM AND METHODS OF AMPLITUDE-MODULATION FREQUENCY-MODULATION (AM-FM) DEMODULATION FOR IMAGE AND VIDEO PROCESSING

(75) Inventors: Victor Manuel Murray Herrera, Albuquerque, NM (US); Marios Stephanou Pattichis, Albuquerque, NM (US); Peter Soliz, Albuquerque, NM (US); Carla Paola Agurto Rios, Albuquerque, NM (US); Herbert T. Davis, III, Corrales, NM (US)

(73) Assignee: STC.UNM, Albuquerque, NM (US)

( * ) Notice: Subject to any disclaimer, the term of this patent is extended or adjusted under 35 U.S.C. 154(b) by 1006 days.

(21) Appl. No.: 12/586,276

(22) Filed: Sep. 18, 2009

Related U.S. Application Data

(60) Provisional application No. 61/098,165, filed on Sep. 18, 2008.

(51) Int. Cl.
*G06K 9/40* (2006.01)
(52) U.S. Cl.
USPC .......................................... 382/260; 382/100
(58) Field of Classification Search
USPC .................................................. 382/100, 260
See application file for complete search history.

(56) References Cited

U.S. PATENT DOCUMENTS

| | | | | |
|---|---|---|---|---|
| 4,780,831 A * | 10/1988 | Iwata et al. | ............. | 382/280 |
| 7,043,082 B2 * | 5/2006 | Larkin et al. | ............. | 382/210 |
| 7,118,217 B2 * | 10/2006 | Kardon et al. | ............. | 351/206 |
| 7,222,961 B2 * | 5/2007 | Soliz et al. | ............. | 351/200 |
| 7,444,032 B2 * | 10/2008 | Larkin et al. | ............. | 382/248 |
| 7,706,992 B2 * | 4/2010 | Ricci et al. | ............. | 702/66 |
| 8,090,163 B2 * | 1/2012 | Schuckers et al. | ............. | 382/125 |
| 2001/0024311 A1 * | 9/2001 | Larkin et al. | ............. | 359/237 |
| 2005/0129297 A1 * | 6/2005 | Kamath et al. | ............. | 382/132 |
| 2006/0120621 A1 * | 6/2006 | Larkin et al. | ............. | 382/280 |
| 2007/0091265 A1 * | 4/2007 | Kardon et al. | ............. | 351/206 |
| 2007/0211211 A1 * | 9/2007 | Soliz et al. | ............. | 351/206 |
| 2008/0253626 A1 * | 10/2008 | Shuckers et al. | ............. | 382/125 |
| 2009/0116595 A1 * | 5/2009 | Senroy et al. | ............. | 375/350 |
| 2010/0195770 A1 * | 8/2010 | Ricci et al. | ............. | 375/322 |

OTHER PUBLICATIONS

M. Pattichis and A. Bovik, "Analyzing Image Structure by Multidimensional Frequency Modulation", May 2007, IEEE Transactions on Pattern Analysis and Machine Intelligence, vol. 29, No. 5, p. 753-766.*

(Continued)

*Primary Examiner* — Claire X Wang
*Assistant Examiner* — Gandhi Thirugnanam
(74) *Attorney, Agent, or Firm* — Valauskas Corder LLC

(57) ABSTRACT

Image and video processing using multi-scale amplitude-modulation frequency-modulation ("AM-FM") demodulation where a multi-scale filterbank with bandpass filters that correspond to each scale are used to calculate estimates for instantaneous amplitude, instantaneous phase, and instantaneous frequency. The image and video are reconstructed using the instantaneous amplitude and instantaneous frequency estimates and variable-spacing local linear phase and multi-scale least square reconstruction techniques. AM-FM demodulation is applicable in imaging modalities such as electron microscopy, spectral and hyperspectral devices, ultrasound, magnetic resonance imaging ("MRI"), positron emission tomography ("PET"), histology, color and monochrome images, molecular imaging, radiographs ("X-rays"), computer tomography ("CT"), and others. Specific applications include fingerprint identification, detection and diagnosis of retinal disease, malignant cancer tumors, cardiac image segmentation, atherosclerosis characterization, brain function, histopathology specimen classification, characterization of anatomical structure such as carotid artery walls and plaques or cardiac motion and as the basis for computer-aided diagnosis to name a few.

18 Claims, 6 Drawing Sheets

(56) References Cited

OTHER PUBLICATIONS

J Havlicek, "AM-FM Image Models", Nov. 8, 1996, Laboratory for Vision Systems, Center for Vision and Image Sciences, University of Texas, p. 1-56.*

J. Havlicek, "AM-FM image models," Ph.D. dissertation, Department of Electrical and Computer Engineering, Univ. Texas, Austin, 1996, p. 1-398.*

A. Bovik, "AM-FM Models: New Image Representations", Center for Vision and Image Sciences, Univ of Texas at Austin, Aug. 2000, p. 1-47.*

Murray, Victor, and Marios S. Pattichis, AM-FM Demodulation Methods for Reconstruction, Analysis and Motion Estimation in Video Signals, IEEE Southwest Symposium on Image Analysis and Interpretation, Mar. 24-26, 2008, pp. 17-20, Santa Fe, NM.

Murray, Victor, et al., An AM-FM model for Motion Estimation in Atherosclerotic Plaque Videos, Conference Record of the Forty-First Asilomar Conference on Signals, Systems and Computers, Nov. 4-7, 2007, pp. 746-750, Pacific Grove, CA.

Murray, Victor, et al., Robust Multiscale AM-FM Demodulation of Digital Images, IEEE International Conference on Image Processing, Sep. 16, 2007-Oct. 19, 2007, pp. I-465-I-468, San Antonio, TX.

Pattichis M.S., et al., Fingerprint Classification Using an AM-FM Model, IEEE Transactions on Image Processing, Jun. 2001, pp. 951-954, vol. 10, iss. 6.

Pattichis M. S., et al., AM-FM Texture Segmentation in Electron Microscopic Muscle Imaging, IEEE Transactions in Medical Imaging, Dec. 2000, pp. 1253-1258, vol. 19, iss. 12.

Pattichis, M. S., et al., MRI Brain Image Segmentation Using an AM-FM Model, 34th Asilomar Conference on Signals, Systems, and Computers, Oct. 29-Nov. 1, 2000, pp. 206-910, Pacific Grove, CA.

* cited by examiner

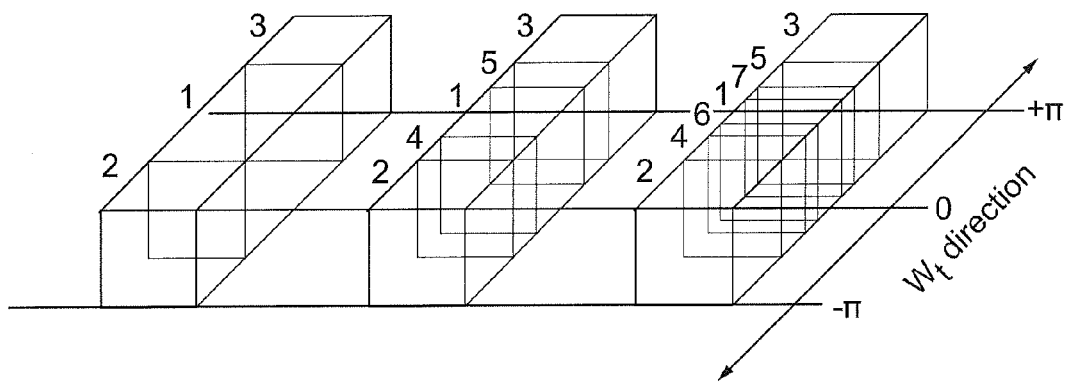
FIG. 3
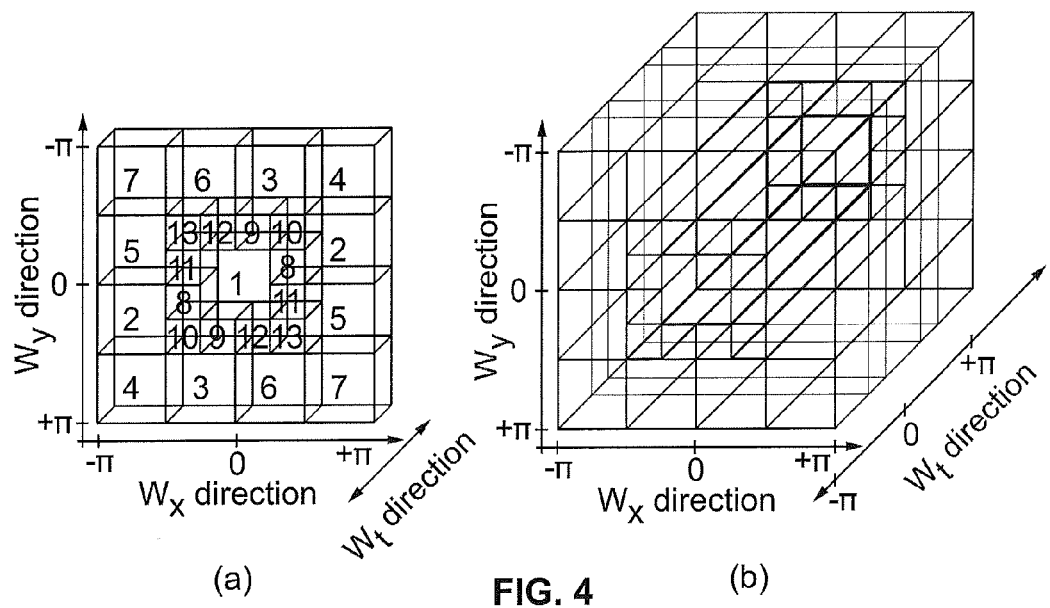
(a) FIG. 4 (b)
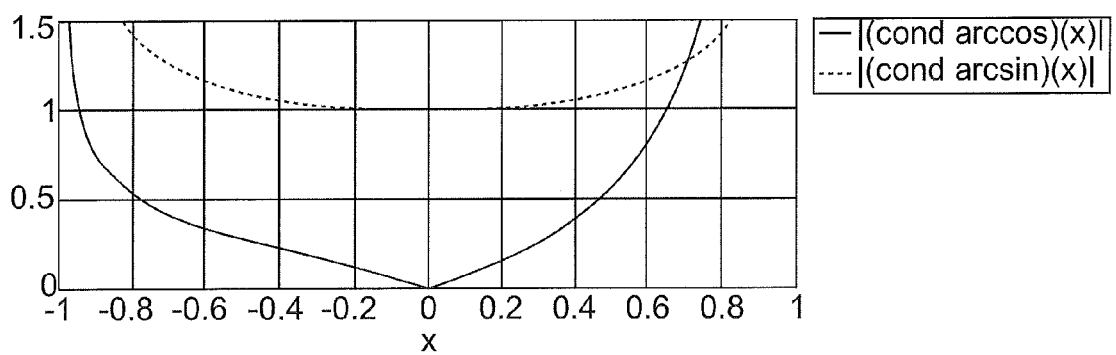
FIG. 5

SYSTEM AND METHODS OF AMPLITUDE-MODULATION FREQUENCY-MODULATION (AM-FM) DEMODULATION FOR IMAGE AND VIDEO PROCESSING

PRIORITY STATEMENT

This application claims the benefit of U.S. Provisional Application No. 61/098,165 filed Sep. 18, 2008.

STATEMENT CONCERNING FEDERALLY SPONSORED RESEARCH

This invention was made with government support under FA9453-06-C-0211 awarded by DARPA and R44EY018280 awarded by the National Institutes of Health. The government has certain rights in the invention.

FIELD OF THE INVENTION

This invention relates to image and video processing. More particularly, this invention is directed to a system and methods of Amplitude-Modulation Frequency-Modulation ("AM-FM") demodulation for processing stationary and non-stationary image and video content.

AM-FM demodulation is useful in a variety of contexts and applications including, for example, characterization and classification of image and video from imaging modalities such as electron microscopy, spectral and hyperspectral devices, ultrasound, magnetic resonance imaging ("MRI"), positron emission tomography ("PET"), histology, color and monochrome images, molecular imaging, radiographs ("X-rays"), computer tomography ("CT"), and others. The specific applications are in fingerprint identification, detection and diagnosis of retinal disease, malignant cancer tumors, cardiac image segmentation, atherosclerosis characterization, brain function, histopathology specimen classification, characterization of anatomical structure tracking such as carotid artery walls and plaques or cardiac motion and as the basis for computer-aided diagnosis to name a few.

BACKGROUND OF THE INVENTION

Image and video processing are forms of signal processing. Signal processing allows a set of characteristics or parameters related to the image or video to be obtained. Signal processing including analog signal processing, discrete time signal processing, and digital signal processing, which may involve a one-dimensional ("1D"), two-dimensional ("2D") or three-dimensional ("3D") input signal to which signal processing techniques are applied.

Signal processing techniques include transform-based processing such as discrete or integral transforms which were implemented prior to AM-FM processing. As an example, a 1D analysis of transform-based processing includes the use of short-time Fourier Transform ("STFT") for non-stationary signals. When using STFT, the fast Fourier Transform ("FFT") of different time intervals of the signals is used to determine the frequency and phase content. Thus, the STFT is a convenient 2D representation that provides frequency content information at different time intervals. A disadvantage is that the STFT cannot be effectively generalized to images and videos. For example, using STFT for images would produce a four-dimensional ("4D") representation and using STFT for video would produce a six-dimensional ("6D") representation.

The discrete Wavelet Transform ("DWT") has also been used for transform-based image processing. Unlike Fourier Transforms, Wavelet Transforms are based on specific functions defined at different scales and durations. Thus, the DWT is a space-frequency representation of the input signal and it is related to harmonic analysis is as in Fourier Transform. While FFT uses equally spaced frequency division, DWT uses logarithmic divisions of the frequency. A disadvantage is that DWT does not measure frequency content directly.

The development of accurate methods for estimating amplitude-modulation frequency-modulation image decompositions is of great interest due to is potentially significant impact on image analysis applications including in the areas of signal, image and video processing. Applications in signal processing include speech signal analysis. Image processing applications include shape from shading, image pattern analysis, image interpolation, fingerprint classification, image retrieval in digital libraries, image segmentation, and damaged image texture repairs. Applications in video processing include cardiac image segmentation, motion estimation, and motion reconstruction, to name a few.

Accurate system and methods for estimating AM-FM components are important due to their potentially significant impact on various applications. Thus, there is demand for improved AM-FM demodulation for both stationary and non-stationary processing for use in a variety of contexts and applications. The present invention satisfies this demand.

SUMMARY OF THE INVENTION

The present invention is directed to multi-scale amplitude-modulation frequency-modulation ("AM-FM") demodulation utilizing a multi-scale filterbank, instantaneous frequency estimation based upon variable-spacing local linear phase and multi-scale least square reconstruction for image and video processing.

According to the present invention, image content or video content can be processed using an AM-FM demodulation method. At least one of a two-dimensional or a three-dimensional extended analytic signal of the input image or input video is computed, respectively. A multi-scale filterbank is selected by defining the bandpass filters that correspond to each scale. In one embodiment, the multi-scale filterbank includes one or more bandpass filters that have been optimally designed using min-max criteria. The extended analytic signal is processed through the multi-scale filterbank and estimates for instantaneous amplitude, instantaneous phase, and instantaneous frequency are calculated. A Variable Spacing Local Linear Phase Model is applied to produce accurate instantaneous frequency estimates. The Variable Spacing Local Linear Phase Model is applied by selecting instantaneous frequency estimates with the minimum value for a condition number, pre-filtering and post-filtering with a median filter, and modulating high-frequency outputs to baseband, wherein the Variable Spacing Local Linear Phase Model is directly applicable. The estimates with the maximum response are selected and the input image or input video is reconstructed using the instantaneous amplitude and instantaneous phase estimates. In one embodiment, the estimates are figured scale by scale to obtain computed estimates.

For purposes of this application, an input image $I(x,y)$ is approximated by a multi-scale AM-FM expansion as given by $$I(x, y) \approx \sum_{n=1}^{M} a_n(x, y)\cos\varphi_n(x, y).$$

For input videos I(x,y,t), a multi-scale AM-FM expansion is given by $$I(x, y, t) \approx \sum_{n=1}^{M} a_n(x, y, t)\cos\varphi_n(x, y, t).$$

These expansions use the instantaneous amplitude functions $a_n$, instantaneous phase functions $\phi_n$, and instantaneous frequency functions $\nabla\phi_n$, where n=1, 2, . . . M denote different scales. For purposes of this application, the term "scale" refers to AM-FM estimates that are derived from a collection of bandpass filters with passbands of similar frequency magnitude. As an example, we categorize scales into low, medium, and high based on frequency magnitude.

Accuracy of estimates is improved, for example optimally designed—in the min-max sense—digital filters are used to improve instantaneous amplitude estimates. The optimally designed digital filters allow control of the pass-band gain such that is close to one while reducing the stop-band gain to be closer to zero. As a result, the use of digital filters allows the removal of the instantaneous amplitude correction step that uses estimates of the instantaneous frequency to correct for the Gabor filterbank response. For AM-FM components falling within the desired pass-band, each digital filter provides better instantaneous amplitude estimates. Interference from the stop-band is effectively controlled by keeping the stop-band gain very low.

To improve estimation accuracy, the use of the condition number of the underlying numerical operations is used. For robust estimation, the mathematical operations maintain low condition numbers. In this approach, which is non-parametric, instantaneous frequency estimation is improved by selecting the method with the lowest condition number at each pixel. Another contemplated robust estimation is based in part on estimating multi-dimensional components over the entire frequency spectrum.

According to the present invention, a small number of AM-FM components are used to reconstruct general input images and videos. AM-FM components are extracted using dominant component analysis applied to different scales. Robust least-squares are used to combine the AM-FM components and provides for a correction method where the coefficients for the AM-FM components are estimated such that they reduce interference. However, sharp changes in instantaneous frequency content can generate strong frequency components throughout the spectrum.

The new AM-FM demodulation methods are based on extensions of the 1D analytic signal that operate with sums and differences of four local image samples. The new AM-FM demodulation method that is considered is an extension of the Quasi-Eigenfunction Approximation ("QEA") method.

AM-FM demodulation methods based on QEA compute the 2D-extended analytic signal for images using $I_{AS}(x,y)=I(x,y)+jH_{2d}[I(x,y)]$, where $H_{2d}$ denotes a 2D-extension of the 1D Hilbert transform operator. The 2D operator is defined in terms of the 1D operator, operating in either the x or y direction:

$$H_{2d}[I(x, y)] = \frac{1}{\pi x} * I(x, y).$$

For the algorithm to work, $I_{AS}(\cdot)$ is equal, or at-least approximately equal, to the complex AM-FM harmonic associated with the single component AM-FM image defined above as shown by: $I_{AS}(x,y) \approx a(x,y)\exp(j\phi(x,y))$. When the approximation holds, it is possible to estimate the instantaneous amplitude by $a(x,y)=|I_{AS}(x,y)|$, the instantaneous phase by $$\varphi(x, y) = \arctan\left(\frac{\text{imag}(I_{AS}(x, y))}{\text{real}(I_{AS}(x, y))}\right),$$

and the instantaneous frequency by $$\omega(x, y) = \text{real}\left[-j\frac{\nabla I_{AS}(x, y)}{I_{AS}(x, y)}\right].$$

The 3D AM-FM demodulation methods are based on extensions of the one-dimensional analytic signal. The first step is to compute the extended 3D version of the one-dimensional analytic signal associated with I(x,y,t). The extended analytic signal is computed using: $I_{AS}(x,y,t)=I(x,y,t)+jH_{3d}[I(x,y,t)]$, where $H_{3d}$ denotes a three-dimensional extension of the one-dimensional Hilbert transform operator. The three dimensional operator is defined in terms of the one dimensional operator, operating in either the x, the y or the t direction:

$$H_{3d}[I(x, y, t)] = \frac{1}{\pi x} * I(x, y, t),$$

for the x direction. For the algorithm to work, $I_{AS}(\cdot)$ is equal, or at-least approximately equal, to the complex AM-FM harmonic $I_{AS}(x,y,t) \approx a(x,y,t)\exp(j\phi(x,y,t))$. When the approximation holds, it is possible to estimate the amplitude, the phase and the instantaneous frequency using $$\hat{a}(x, y, t) = |I_{AS}(x, y, t)|,$$
$$\hat{\varphi}(x, y, t) = \arctan\left(\frac{\text{imag}(I_{AS}(x, y, t))}{\text{real}(I_{AS}(x, y, t))}\right),$$

and $$\hat{\nabla}\varphi(x, y, t) = \text{real}\left[-j\frac{\nabla I_{AS}(x, y, t)}{I_{AS}(x, y, t)}\right],$$

respectively.

For discrete-space signals, the discrete-space input signal is considered given by $I(k_1,k_2)=a(k_1,k_2)\cos\phi(k_1,k_2)$, where $k_1$ and $k_2$ represent the discrete versions of x and y, respectively. The 2D extended analytic signal $\hat{I}_{AS}(k_1,k_2)$ is computed using the partial Hilbert Transform implemented using the Fast Fourier Transform ("FFT"). With the instantaneous amplitude and instantaneous phase estimated by the equations above, the instantaneous frequency can be estimated using:

$$\hat{\varphi}_x(k_1, k_2) = \arcsin\left[\frac{\hat{I}_{AS}(k_1+1, k_2) - \hat{I}_{AS}(k_1, 1, k_2)}{2j\hat{I}_{AS}(k_1, k_2)}\right],$$

$$\hat{\varphi}_y(k_1, k_2) = \arcsin\left[\frac{\hat{I}_{AS}(k_1, k_2+1) - \hat{I}_{AS}(k_1, k_2-1)}{2j\hat{I}_{AS}(k_1, k_2)}\right],$$

$$\hat{\varphi}_x(k_1, k_2) = \arccos\left[\frac{\hat{I}_{AS}(k_1+1, k_2) + \hat{I}_{AS}(k_1-1, k_2)}{2\hat{I}_{AS}(k_1, k_2)}\right]$$

$$\hat{\varphi}_y(k_1, k_2) = \arccos\left[\frac{\hat{I}_{AS}(k_1, k_2+1) + \hat{I}_{AS}(k_1, k_2-1)}{2\hat{I}_{AS}(k_1, k_2)}\right].$$

For discrete videos, the discrete-space-time input signal is given by $I(k_1,k_2,k_3) \approx a(k_1,k_2,k_3)\cos\phi(k_1,k_2,k_3)$, where $k_1$ and $k_2$ represent the discrete versions of x and y, respectively, and $k_3$ represents the discrete version of t. The conversion of the estimated discrete frequencies back to continuous space is not considered. The present invention produces an estimate of $a(k_1,k_2,k_3)\exp(j\phi(k_1,k_2,k_3))$ from $a(k_1,k_2,k_3)\cos\phi(k_1,k_2,k_3)$ very fast. The discrete-space-time extended estimate of the 1-D analytic signal is defined as $\hat{I}_{AS}(k_1,k_2,k_3)$. This is accomplished via the use of a discrete-time Hilbert Transform or using the Fast Fourier Transform ("FFT").

The 2D robust QEA method is extended to 3D such that $\bar{I}_{AS}$ is defined as:

$$\bar{I}_{AS}(k_1, k_2 k_3) =$$

$$\frac{\hat{I}_{AS}(k_1, k_2, k_3)}{|\hat{I}_{AS}(k_1, k_2, k_3)|} = \frac{a(k_1, k_2, k_3)\exp(j\varphi(k_1, k_2, k_3))}{a(k_1, k_2, k_3)} = \exp(j\varphi(k_1, k_2, k_3)).$$

Then, for the instantaneous frequency—assuming $\delta x = \delta y = \delta t = 1$—the following are obtained:

$$\hat{\varphi}_x(k_1, k_2, k_3) = \frac{1}{n_1}\arcsin\left[\frac{\bar{I}_{AS}(k_1+n_1, k_2, k_3) - \bar{I}_{AS}(k_1-n_1, k_2, k_3)}{2j\bar{I}_{AS}(k_1, k_2, k_3)}\right],$$

$$\hat{\varphi}_y(k_1, k_2, k_3) = \frac{1}{n_2}\arcsin\left[\frac{\bar{I}_{AS}(k_1, k_2+n_2, k_3) - \bar{I}_{AS}(k_1, k_2-n_2, k_3)}{2j\bar{I}_{AS}(k_1, k_2, k_3)}\right],$$

$$\hat{\varphi}_x(k_1, k_2, k_3) = \frac{1}{n_3}\arcsin\left[\frac{\bar{I}_{AS}(k_1, k_2, k_3+n_3) + \bar{I}_{AS}(k_1, k_2, k_3-n_3)}{2j\bar{I}_{AS}(k_1, k_2, k_3)}\right],$$

$$\hat{\varphi}_y(k_1, k_2, k_3) = \frac{1}{n_1}\arccos\left[\frac{\bar{I}_{AS}(k_1, +n_1, k_2, k_3) + \bar{I}_{AS}(k_1-n_1, k_2, k_3)}{2\bar{I}_{AS}(k_1, k_2, k_3)}\right],$$

$$\hat{\varphi}_y(k_1, k_2, k_3) = \frac{1}{n_2}\arccos\left[\frac{\bar{I}_{AS}(k_1, k_2+n_2, k_3) + \bar{I}_{AS}(k_1, k_2-n_2, k_3)}{2\bar{I}_{AS}(k_1, k_2, k_3)}\right] \text{ and}$$

$$\hat{\varphi}_t(k_1, k_2, k_3) = \frac{1}{n_3}\arccos\left[\frac{\bar{I}_{AS}(k_1, k_2, k_3+n_3) + \bar{I}_{AS}(k_1, k_2, k_3-n_3)}{2\bar{I}_{AS}(k_1, k_2, k_3)}\right],$$

with similar constraints as in the 2D case described above. Here, robust estimation is achieved by considering different integer spacing choices for $n_1$, $n_2$, $n_3$ so that the condition numbers of the inverse trigonometric functions are minimized.

The present invention is useful in a variety of contexts and applications, and allows the identification of disease at different stages, such as retinal disease (diabetic retinopathy, age-related macular degeneration, glaucoma, etc.), pulmonary diseases (pneumoconiosis, lung nodules tumors, etc.), breast cancer, cellular abnormalities, or any pathological structure in a medical or biomedical image or video. Following are more specific examples of applications and context in which the present invention pertains.

AM-FM demodulation techniques may be used for determining disease progressing in X-ray images for example X-ray images presenting pneumoconiosis. The AM-FM features are estimated using multi-scale filterbanks with instantaneous wavelengths related with the standard sizes for grading the level of opacities in X-rays. The AM-FM estimates show correlation between opacity profusion and certain instantaneous frequency and instantaneous amplitude in the sense of the counts of their histograms. Histograms are formed from extracted AM-FM features and a classification is determined using the extracted features. The instantaneous frequency estimates computed in medium and high frequencies are able to detect the first symptoms and appearance of opacities in the chest. The instantaneous frequency estimates computed in the range of low and medium frequencies reflect the different grade when a disease is in various stages.

It should be noted that imaging modalities according to the present invention that may produce a digital representation of an anatomical and pathological structure including, for example, standard color ("RGB"), ultrasound, radiograph, computer tomography ("CT") image slice, magnetic resonance image ("MRI"), functional MRI ("f-MRI"), fluorescence images, molecular imaging, and any other imaging modality that produces 2-D, 3-D or 4-D representations of the structure.

AM-FM demodulation techniques may also be used for describing atherosclerotic plaque features that are associated with clinical factors such as the texture changes in the intima media complex, the intima media, and the intima layer, as they vary with a patient's age. AM-FM analysis reveals significant changes in the instantaneous amplitude and instantaneous frequency magnitude of the media and intima layer as a function of patient age. The findings suggest that AM-FM features can be used to assess the risk of stroke over a wide range of patient populations. A texture image retrieval system is contemplated that uses AM-FM features to retrieve intima and intima media layer images that could be associated with the same level of the risk of stroke.

AM-FM based methods also address some issues associated with the semantic gap between visual and mathematical features presented by retinal diseases such as age-related macular degeneration ("AMD"). Through the processing of simulated and real, clinical retinal images, an understanding is achieved of the effects of basis morphological characteristics of lesions associated with AMD. Through synthetic simulation, histograms of the instantaneous amplitude and the instantaneous frequency magnitude, extracted from different scales, can be used to differentiate between images of different sizes and edge sharpness, while maintaining invariance with respect to rotations. AM-FM features extracted from low and very-low frequency scales can clearly differentiate between retinal images containing Temporal Concentrated Drusen ("TCD") and Geographic Atorphy ("GA"). Shape, size, distribution and edge sharpness are visual features used by ophthalmologists in identifying lesions such as drusen. AM-FM derived features can quantitatively define these visual descriptions.

Multi-scale AM-FM analysis can also be used in a computer-aided diagnostic ("CAD") system for reading chest radiographs and further in compliance with the International Labor Organization ("ILO") standards. The AM-FM based methodology permits a computer-based system to screen all "normals, 0/0" and detect those with suspected interstitial lung diseases. Different AM-FM classifiers based on extracting features from individual scales as well as a final classifier that combines results from the individual scales are used.

The present invention can also be used for the detection of structures in the retina using AM-FM for diabetic retinopathy classification. The presence and severity of AMD in current epidemiological studies is detected by the grading of color stereoscopic fundus photographs. It is contemplated that a mathematical technique, AM-FM can be used to generate multi-scale features for classify pathological structures, such as drusen, on a retinal image. Drusen can be differenced from normal retinal structures by more than three standard deviations using the AM-FM histograms. In addition, using different color spaces perfect classification of structures of the retina is achieved, which may be used in the development of an automated AMD grading system.

Diabetic retinopathy ("DR") severity levels can be assigned to people with diabetes based on AM-FM from color fundus photographs, which automatically adjusts all model parameters based on the quality and format of the data. AM-FM techniques according to the present invention are attractive for developing a system for detecting diabetic retinopathy ("DR") risk levels from retinal color photographs. It is contemplated that the automatic detection of abnormal regions in digital color fundus images can be used for detection of other retinal abnormalities indicative of a retinal disease including, but not limited to, age-related macular degeneration, glaucoma, drusen, geographic atrophy, microaneurysms, dot hemorrhages, sub-retinal hemorrhages, flame-shaped hemorrhages, cotton-wool spots, exudates and pigment abnormalities, to name a few.

The present invention can also be applied to multidimensional AM-FM methods for motion estimation. For a single AM-FM component, the optical flow constraint leads to separate equations for amplitude modulation and frequency modulation. This results in dense estimates that remain accurate over the entire video.

The present invention also applies to pixel-level based motion estimation using an AM-FM model for digital video, which may be considered in analyzing atherosclerotic plaque motion.

It is also contemplated that AM-FM representations can be used for the characterization of carotid plaques ultrasound images for the identification of individuals with asymptomatic carotid stenosis at risk of stroke. To characterize the plaques using AM-FM features, the instantaneous amplitude, the instantaneous frequency magnitude and the instantaneous frequency angle are computed in order to capture directional information. For each AM-FM feature, the histograms are computed over the plaque regions. The statistical K-nearest neighbor ("KNN") classifier is implemented for the classification of the carotid plaques into symptomatic or asymptomatic using the leave-one-out methodology.

AM-FM methods are useful for extracting potentially relevant features towards the classification of diseased retinas from healthy retinas. In terms of AM-FM features, histograms of the instantaneous amplitude, the angle of the instantaneous frequency and the magnitude of the instantaneous frequency extracted over different frequency scales are used. A combination of a clustering method and Partial Least Squares ("PLS") are used to classify the AM-FM features.

An object of the present invention is to provide an accurate method for multidimensional, multi-scale AM-FM demodulation for use in numerous contexts and applications including accurate image and video reconstructions, analyzing medical images and video, as well as new applications in motion estimation, image classification and segmentation, resolution enhancement, image analysis content-based image retrieval and video activity detection to name a few.

Another object of the present invention is to provide an efficient instantaneous frequency demodulation method taking advantage of optimal (in the min-max sense), multi-scale filterbanks including 2D filterbanks and 3D filterbanks.

Another object of the present invention is to provide 2D and 3D reconstruction methods using AM-FM models. Least-squares reconstructions using AM-FM models provide effective 2D and 3D signals representations.

Yet another object of the present invention is to provide methods for motion estimation that produce better estimates over different scales.

Another object of the present invention is to provide methods for content-based video retrieval for activity recognition.

Another object of the present invention is to provide a correlation between features that represent the frequency and amplitude characteristics of an image and visual features seen by an observer. Various visually recognized features can be detected and defined using computer vision-based methods, for example, fundus patterns (fundus phenotypes) and classification for retinal images.

Another object of the present invention is to provide real-time classification of image quality. The present invention reduces computational time by not requiring explicit segmentation of structures subject of the image.

The present invention and its attributes and advantages will be further understood and appreciated with reference to the detailed description below of presently contemplated embodiments, taken in conjunction with the accompanying Figures.

BRIEF DESCRIPTION OF THE DRAWINGS

FIG. 3 illustrates numbering of the bandpass filters for the time variable for 3D single-scale, 3D two-scale, and 3D three-scale filterbanks according to the present invention;

FIG. 4 illustrates frequency spectrum decomposition for a 3D two-scale filterbank according to the present invention;

FIG. 5 illustrates a graph of the absolute value of condition numbers according to the present invention;

DETAILED DESCRIPTION OF EMBODIMENTS OF THE INVENTION

Figure 1:
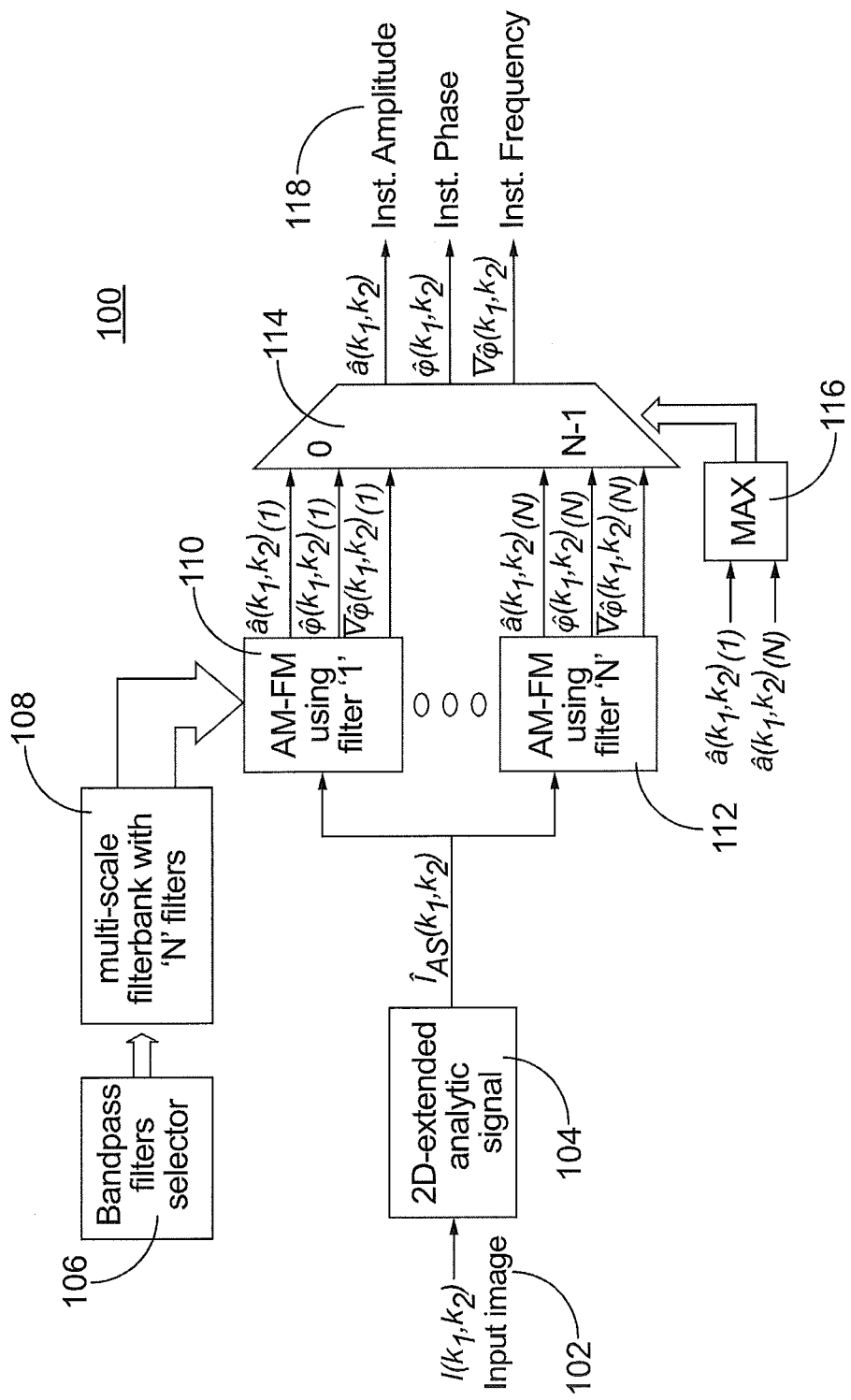
FIG. 1 illustrates a block diagram of multi-scale AM-FM demodulation according to the present invention.

FIG. 1 illustrates a block diagram of multi-scale AM-FM demodulation 100 according to the present invention, specifically illustrating estimation of a single AM-FM component from a single scale. For purposes of this application, the term "scale" is defined as a collection of bandpass filters. As an example, scales can be categorized into low, medium, and high based on frequency magnitude. As shown in FIG. 1, an input image $I(k_1,k_2)$ is provided at 102. It is also contemplated that an input video may be provided as described further below. A two-dimensional extended analytic signal $I_{AS}(k_1,k_2)$ of the input image is computed at 104 by applying the Hilbert transform to form a 2D extension of the 1D analytic signal. For either an input image or input video, a multi-scale filterbank is selected at 106. A multi-scale filterbank is selected by defining the bandpass filters at 108 that correspond to each scale as described in further detail with respect to FIG. 2. The extended analytic signal is processed through a multi-scale filterbank as shown by 110, 112. Estimates for instantaneous amplitude, instantaneous phase, and instantaneous frequency are calculated at 114. The dominant AM-FM component is selected at 116 using the maximum amplitude at every pixel. Thus, the estimates with the maximum response are selected. Instantaneous amplitude, instantaneous phase and instantaneous frequency estimates are obtained at 118. These estimates are obtained by the QEA method described above. Instantaneous amplitude and instantaneous frequency estimates are used to reconstruct the image such that it can be displayed on a display unit.

The processing for a discrete video is similar to that described above. A discrete video $I(k_1,k_2,k_3)$ is provided. A Hilbert transform is applied to form a 3D extension $I_{AS}(k_1, k_2,k_3)$ of the 1D analytic signal. A multi-scale filterbank is selected by defining the bandpass filters that correspond to each scale as described in further detail with respect to FIG. 3. The extended analytic signal is processed through the multi-scale filterbank and the instantaneous frequencies are estimated in all x, y and t directions. For each pixel, the AM-FM demodulation estimates are selected from the processing block that gives the largest instantaneous amplitude estimate. Hence, the algorithm adaptively selects the estimates from the bandpass filter with the maximum response. This approach does not assume spatial continuity, and allows the model to quickly adapt to singularities in the input signal. Instantaneous amplitude and instantaneous frequency estimates are used to reconstruct the video such that it can be displayed on a display unit.

Dominant component analysis is applied over each scale to produce a single AM-FM component from each scale. Estimates are adaptively selected from the bandpass filter with the maximum response. This approach does not assume spatial continuity and allows the model to quickly adapt to singularities in the image or video. Although any collection of filters for each scale is contemplated, in one embodiment the corresponding collection of filters for each scale is shown below by Table 1:

TABLE 1

Bandpass filters corresponding to different image scales

| Scale | Single-scale | Two-scale | Three-scale |
|---|---|---|---|
| LPF | 1 | 1 | 1 |
| High frequencies | 2, 3, 4, 5, 6, 7 | 2, 3, 4, 5, 6, 7 | 2, 3, 4, 5, 6, 7 |
| Medium frequencies | NA* | 8, 9, 10, 11, 12, 13 | 8, 9, 10, 11, 12, 13 |
| Low frequencies | NA* | NA* | 14, 15, 16, 17, 18, 19 |

Figure 2:
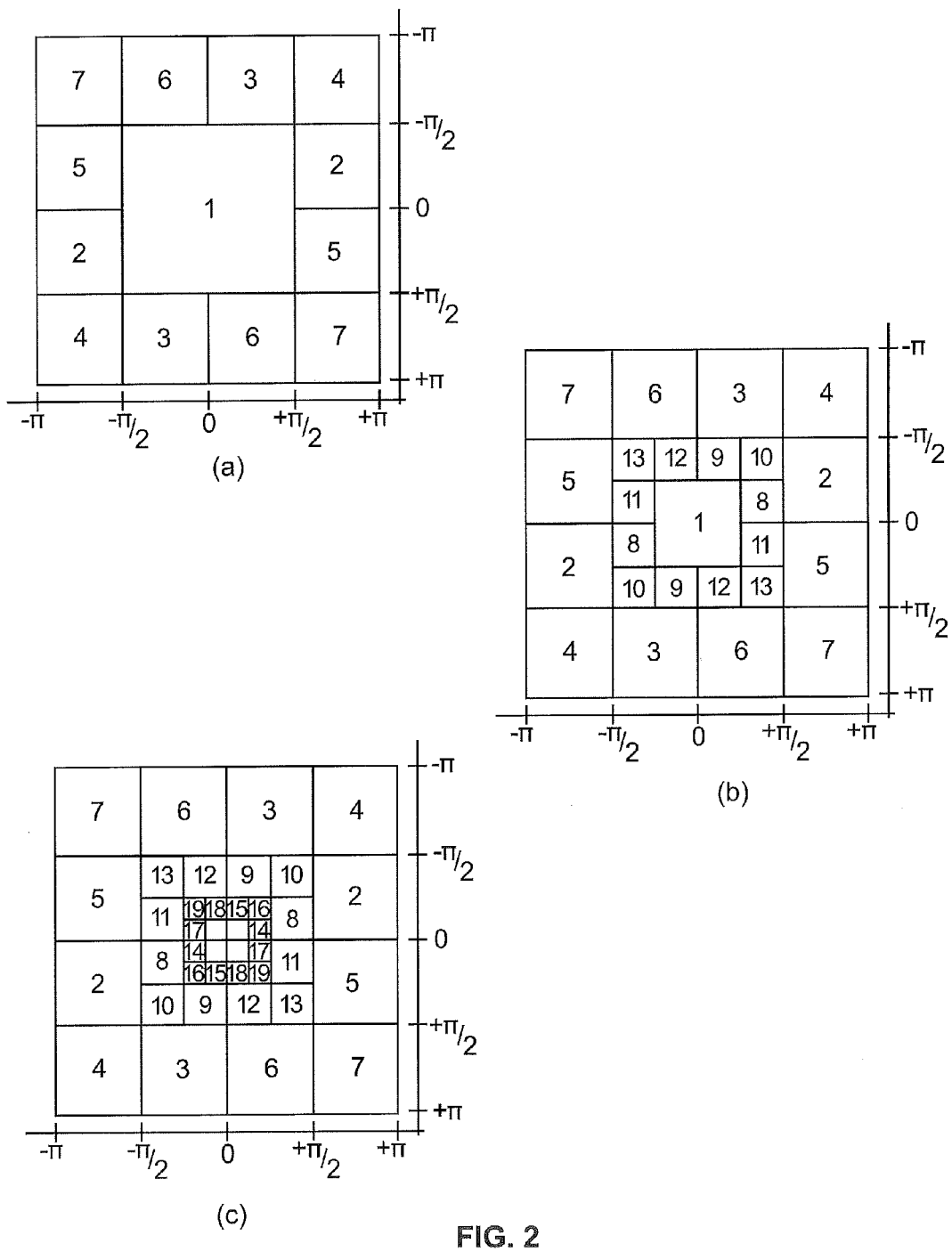
FIG. 2 illustrates multi-scale filterbanks of channel filters for (a) single-scale, (b) two-scale and (c) three-scale filterbanks according to the present invention.

Multi-scale filterbanks covering the whole frequency spectrum are used for images as shown in FIG. 2. For real-valued bandpass filters, each separable channel filter has support over four quadrants. In order to maintain support over only two quadrants, Fast Fourier Transform ("FFT") pre-filtering is used to remove support in two quadrants such as the two left or tow right quadrants. Thus, each bandpass filter has frequency support in only two quadrants of the frequency spectrum so that, in effect, each channel filter operates over a single quadrant. The filters were designed using a min-max, equiripple approach. In one embodiment, passband ripple is set at 0.017 dB and the stopband attenuation is set to 66.02 dB.

The design of an efficient filterbank to be used in 3D methods and applications is shown in FIG. 3 and FIG. 4. FIG. 3 shows the extended 2D filterbank design to generate a 3D multi-scale filterbank illustrating the numbering of bandpass filters for the time variable for 3D single-scale, 3D two-scale, and 3D three-scale filterbanks. The same equiripple design, with the same specifications, is used. The third dimension, time, will increase the total number of bandpass filters. The bandpass filters always have frequency support in only half of the spectrum. For the filters through time, the following notation is used: filter 1 is the low pass filter ("LPF"), filters 2 and 3 are high frequency filters, filters 4 and 5 are medium frequency filters, and filters 6 and 7 are low frequency filters.

As an example, in embodiments where 2D applications have designed filterbanks with 7, 13 and 19 bandpass filters for a single-, two- and three-scale filterbank, respectively, the 3D filterbanks have 21, 65 and 133 3D bandpass filters, respectively.

FIG. 4($a$) illustrates frequency spectrum decomposition for a 3D two-scale filterbank, but with the added frequencies associated with the time variable. FIG. 4($b$) shows the 3D frequency-domain decomposition for a 3D two-scale filterbank.

For the transition bandwidth, it is required that it remains lower than the passband bandwidth and also that it remains sufficiently large so that the passband and stopband requirements can be met with a reasonable number of digital filtering coefficients. Transition widths are relatively less important for the high frequencies since they also come with filters of larger passband bandwidths. In contrast, low-frequencies require relatively larger transition widths since images contain larger, low-frequency components and the transitions occur over smaller bandwidths. Transition bandwidths are fixed to $\pi/10$. Based on this approach, the unit gain over the passband eliminated the need for amplitude correction as required by a Gabor filterbank approach.

In order to develop robust demodulation techniques, it must be ensured that no intermediate computation step results in the loss of significance, particularly avoiding excessive relative error.

The relative error is defined in the approximation as given by $|x_{true}-x_{approx}|/|x_{true}|$ where the number $x_{approx}$ is used as an approximation of the true value $x_{true}$. For one-dimensional functions, the notion of relative error to relative perturbation is generalized as $(f(x+h)-f(x))/f(x)$, which measures the relative change in evaluating f at x, for relative change in x given by h/x. A large relative perturbation for small relative change in x implies instability. A well-known estimate of relative perturbation is based on the condition number of the function as summarized below.

Starting from the Taylor theorem with remainder $f(x+h)=f(x)+hf'(x)+R(x)$, where $|R(x)| \leq \max_{t \in [x,x+h]} |f''(t)| h^2/2$, the relative perturbation is given by:

$$\frac{f(x+h) - f(x)}{f(x)} \approx \frac{hf'(x)}{f(x)} = \left[\frac{xf'(x)}{f(x)}\right]\frac{h}{x}, x \neq 0.$$

The error in the relative error approximation is bounded by $R(x)/f(x) \leq h^2/(2f(x))\max_{t \in [x,x+h]}|f''(t)|$ noting that the relative perturbation in x (given by h/x) is amplified by the condition number given by:

$$(cond\ f)(x) := \left|\frac{x \cdot f'(x)}{f(x)}\right|.$$

More generally, in evaluating functions, the condition numbers of all intermediate functions used in the computation need to be considered. The computation is unstable and prone to error if any one intermediate function has a large condition number. For robust methods, it is sought to develop numerically stable algorithms that are characterized by the smallest possible condition numbers.

In the development of AM-FM demodulation methods, three inverse trigonometric functions are encountered: arcsin, arcos, and arctan with their condition numbers given by $$(cond\ \arccos)(x) = \frac{|x|}{|\arccos(x)|\left|\sqrt{1-x^2}\right|},$$

$$(cond\ \arcsin)(x) = \frac{|x|}{|\arcsin(x)|\left|\sqrt{1-x^2}\right|},$$

$$(cond\ \arctan)(x) = \frac{|x|}{|\arctan(x)||1+x^2|}.$$

Again, the approximation error of the relative error is bounded above by $h^2/(2f(x))\max_{t \in [x,x+h]}|f''(t)|$. Therefore the error for the arccos is bounded above by $$\frac{h^2}{2\arccos(x)}\max_{t \in [x,x+h]}\left|\frac{t}{(1-t^2)^{1.5}}\right|.$$

Similarly, for the arcsin and arctan, the errors are bounded above by:

$$\frac{h^2}{2\arcsin(x)}\max_{t \in [x,x+h]}\left|\frac{t}{(1-t^2)^{1.5}}\right|$$

and $$\frac{h^2}{2\arctan(x)}\max_{t \in [x,x+h]}\left|\frac{t}{(1-t^2)^2}\right|.$$

For the arccos, it is interesting to note that the approximation error remains low around x=0.

The condition numbers become infinite for both the arcsin and the arccos for x=±1 as shown by FIG. 5. Otherwise, finite condition numbers exist for all values of x, including the cases when arcsin (x)=0, arcos (x)=0, or arctan (x)=0.

As shown by FIG. 5, evaluating the arccos is more stable for |x|<0.6 than evaluating the arcsin. More specifically, the absolute value of the condition number for the arcos and the absolute value of the condition number for the arcsin is shown. Furthermore, the most stable evaluations occur for small values of |x|, when using the arccos function. Absolute value of the condition number of the arcos (solid line)

Even though the arccos function provides the most stable evaluations, the arcsin function must also be used to estimate the proper instantaneous frequency quadrant, although, there are also significant problems in accurate estimation at very high frequencies.

According to the present invention, a robust instantaneous frequency estimation is termed herein as Variable Spacing, Local Linear Phase ("VS-LLP") described below.

Due to the unit gain over the passbands, a plug-in rule is used to produce a new signal $\bar{I}_{AS}$ with unit instantaneous amplitude using:

$$\bar{I}_{AS}(k_1, k_2) = \frac{\hat{I}_{AS}(k_1, k_2)}{|\hat{I}_{AS}(k_1, k_2)|} = \frac{a(k_1, k_2)\exp(j\hat{\varphi}(k_1, k_2))}{a(k_1, k_2)} = \exp(j\hat{\varphi}(k_1, k_2)).$$

A linear approximation is considered for the estimated phase $\hat{\varphi}(p_1,p_2)$ of order $\|[p_1-k_1,p_2-k_2]\|^2$, given by $\varphi(p_1, p_2) \approx \hat{\varphi}(k_1,k_2)+[p_1-k_1, p_2-k_2]\nabla\hat{\varphi}(k_1,k_2)$ to get:

$$\frac{\bar{I}_{AS}(k_1+n_1, k_2) + \bar{I}_{AS}(k_1-n_1, k_2)}{2\bar{I}_{AS}(k_1, k_2)} =$$

$$\frac{\exp(j\hat{\varphi}(k_1+n_1, k_2)) + \exp(j\hat{\varphi}(k_1-n_1, k_2))}{2\exp(j\hat{\varphi}(k_1, k_2))} \approx$$

$$\frac{\exp(j\hat{\varphi}(k_1, k_2))[\exp(jn_1 \nabla \hat{\varphi}) + \exp(-jn_1 \nabla \hat{\varphi})]}{2\exp(j\hat{\varphi}(k_1, k_2))} = \cos\left(n_1 \frac{\partial \varphi}{\partial x}(k_1, k_2)\right)$$

This gives an arc-cosine expression for estimating the instantaneous frequency component using:

$$\frac{\partial \hat{\varphi}}{\partial x}(k_1, k_2) = \frac{1}{n_1}\arccos\left(\frac{\bar{I}_{AS}(k_1+n_1, k_2) + \bar{I}_{AS}(k_1-n_1, k_2)}{2\bar{I}_{AS}(k_1, k_2)}\right).$$

The analysis for $\partial\hat{\varphi}/\partial y$ is similar.

For low instantaneous frequency magnitude, it is clear that the local linear phase approximation will hold over a larger range of $n_1, n_2$. For larger instantaneous frequency magnitude, the phase must be modulated down to lower frequencies as described below.

The arc-cosine function is evaluated at different possible values for $n_1$. For stable function evaluations, the argument to the arc-cosine function is considered:

$$\gamma_{arccos}(n_1) = \frac{\bar{I}_{AS}(k_1+n_1, k_2) + \bar{I}_{AS}(k_1-n_1, k_2)}{2\bar{I}_{AS}(k_1, k_2)}.$$

Integer values for $n_1$ so as to have $\gamma_{arccos}(n_1)$ as close to zero as possible are considered (see FIG. 5). Four possible values: $n_1=1, 2, 3$ and 4 are considered—increasing the value of $n_1$ could lead to an unstable zone. Additionally, only integer values are considered since non-integer values require image interpolation and possible additional errors due to the additional interpolation step.

To establish the limits of this approach, in order for the argument of $\gamma_{arccos}(\cdot)$ to be zero, it is required that:

$$\bar{I}_{AS}(k_1-n_1,k_2)=-\bar{I}_{AS}(k_1+n_1,k_2).$$

Thus, for $n_1=1$, the maximum frequency that can be attained, without requiring interpolation, will be $w_1=\pi/2$. However, this limitation is circumvented by modulating the input image to lower frequencies. On the other hand, for the maximum value of $n_1=4$, the instantaneous frequency estimation down to $w_1=\pi/8$ is considered.

Figure 6:
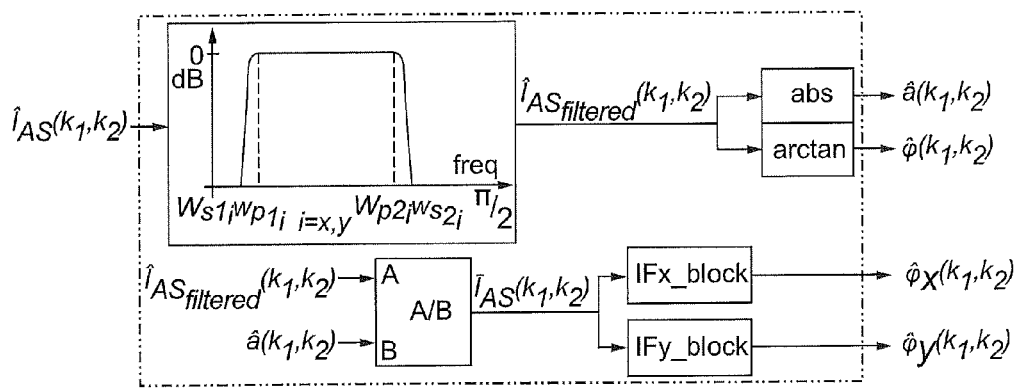
FIG. 6 illustrates a block diagram of the Variable Spacing, Local Linear Phase ("VS-LLP") according to the present invention.
Figure 7:
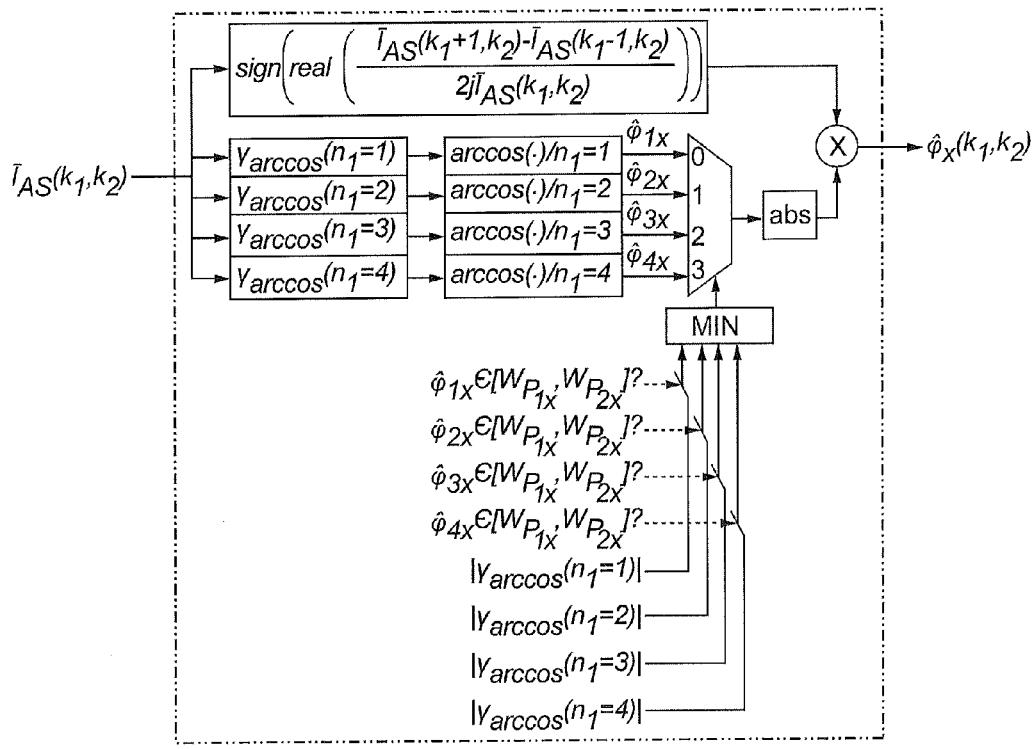
FIG. 7 illustrates a block diagram of the IFy_block of FIG. 6 according to the present invention.

As shown by FIG. 6, the AM-FM demodulation algorithm is applied over a filterbank of bandpass filters to further improve the accuracy of the approach. FIG. 7 illustrates the IFx_block where $$\gamma_{arccos}(n_1) = \frac{\bar{I}_{AS}(k_1+n_1,k_2) + \bar{I}_{AS}(k_1-n_1,k_2)}{2\bar{I}_{AS}(k_1,k_2)}$$

as described above. Clearly, it is possible for the actual instantaneous frequency to fall outside of the spectral support of any given channel filter. Given the fact that the filterbank covers the entire spectrum, it can be expected that the instantaneous frequency will fall within the spectral support of one of the channel filters. It is assumed that local image coherency will force the instantaneous frequency estimate to fall within the passband of the dominant bandpass filter. Looking for the minimum arc-cosine argument that also falls within the passband of the estimating bandpass filter, the following is computed:

$$\min_{n_1=1,2,3,4} |\gamma_{arccos}(n_1)|$$

subject to $$\frac{\partial \hat{\varphi}}{\partial x} \in [w_{P1x}, w_{P2x}]$$

where $[w_{P_{1x}}, w_{P_{2x}}]$ denotes the passband for the horizontal frequencies. A similar approach is taken for $\partial\hat{\varphi}/\partial y$.

Again, the VS-LLP method is limited to $\pi/2$. Modulation is applied to the input image for higher frequencies. Thus, for high frequencies, modulation of the input signal to lower frequencies requires multiplying by $\exp(jw_{M_1}k_1+jw_{M_2}k_2)$. The frequencies $w_{M_1}$ and $w_{M_2}$ are determined by the frequency support of the bandpass filter where the dominant amplitude is to be estimated. Table 2 illustrates the bandpass filter numbers referred to in FIG. 2 and also shows the values of $w_{M_1}$ and $w_{M_2}$ depending on the frequency support of the signal:

TABLE 2

Modulation frequency factors for high frequency signals

| Bandpass filter | $\omega M_1$ | $\omega M_2$ | Bandpass filter | $\omega M_1$ | $\omega M_2$ |
|---|---|---|---|---|---|
| 2 | $+\pi/2$ | 0 | 3 | 0 | $-\pi/2$ |
| 4 | $+\pi/2$ | $-\pi/2$ | 5 | $-\pi/2$ | 0 |
| 6 | 0 | $-\pi/2$ | 7 | $-\pi/2$ | $-\pi/2$ |

For wide-band single component signals, the limited bandwidths of the channel filters can significantly reduce estimation accuracy. Therefore a 3×3 median filter is applied to the input signal. Also, the same median filter is applied to the instantaneous frequency estimation outputs (for both x and y directions) to provide continuity in the estimates.

The image input or video input is reconstructed using its AM-FM components. Various approaches are used for image and video reconstruction: (1) using AM-FM harmonics, (2) using AM-FM components extracted from different scales, and (3) a combined approach. For the reconstructions, least squares methods derived from the proposed multi-scale decomposition that are computed using QEA estimates of the phase and instantaneous amplitude are used.

For images, Least-Squares Reconstructions ("LESHA") considered reconstructing an image using its AM-FM harmonics:

$$\hat{I}(k_1,k_2) \approx d + \sum_{n=1}^{h} c_n a(k_1,k_2)\cos(n\varphi(k_1,k_2)).$$

where d denotes a constant direct current ("DC") image. The instantaneous amplitude $a(k_1,k_2)$ and the instantaneous phase $\varphi(k_1,k_2)$ are estimated using dominant component analysis over all scales (see FIG. 2).

The AM-FM harmonic coefficients $c_n$, $n=1, 2, \ldots, h$ are computed so that $\hat{I}(k_1,k_2)$ is a least-squares estimate of $I(k_1,k_2)$ over the space of the AM-FM harmonics. $c_n$ is computed using:

$$\begin{bmatrix} d \\ c_1 \\ \vdots \\ c_M \end{bmatrix} = (A^T A)^{-1}(A^T b),$$

where the columns of A contain the basis functions. Thus, the first column of A is filled with 1's while the $i^{th}$ column is filled with the values of the $(i-1)^{th}$ AM-FM harmonic, and b is a column vector of the input image. An orthonormal basis is computed over the space of the AM-FM harmonics using the Modified Gram-Schmidt ("MGS") Algorithm, which can also be used to provide least squares estimates of the input image.

Extending LESHA by simply adding the low-pass filter ("LPF") output to the DC and the AM-FM harmonics is referred to herein as Least-Squares Reconstructions using AM-FM harmonics and the LPF ("LESCA"), which provides:

$$\hat{I}(k_1,k_2) \approx d + c_0 G(k_1,k_2) + \sum_{n=1}^{h} c_n a(k_1,k_2)\cos(n\varphi(k_1,k_2)),$$

for images where h is the number of AM-FM harmonics, d denotes a constant DC image, $G(k_1,k_2)$ denotes the LPF output, a $\cos \varphi$ denotes the dominant AM-FM component estimated across scales and a $\cos n\varphi$ denotes the $n^{th}$ AM-FM harmonic. It is noted that the phase images are directly estimated for LESHA and LESCA.

The third method uses AM-FM estimates extracted from different scales known as Multi-Scale Least-Squares Reconstructions ("MULTILES"). The correspondence between scales and bandpass filters is described in Table 2 above (see FIG. 2). In this case, least squares reconstructions for images is given by:

$$\hat{I}(k_1,k_2) \approx d + c_0 G(k_1,k_2) + \sum_{n=1}^{s} c_n a_n(k_1,k_2)\cos(\varphi_n(k_1,k_2)),$$

where s is the number of scales used, d is a global DC image estimate, $G(k_1,k_2)$ is the low-pass filter output, $a_1 \cos \phi_1$ is the high-frequency scale AM-FM component, $a_2 \cos \phi_2$ is the medium-frequency scale AM-FM component and $a_3 \cos \phi_3$ is the low-frequency scale AM-FM component. The AM-FM multi-scale coefficients $c_n$, n=0, 1, . . . , s are computed so that $\hat{I}(k_1,k_2)$ is a least-squares estimate of $I(k_1,k_2)$.

Video is reconstructed using its AM-FM components by extending the application presented for 2D signals to get 3D versions of the three methods discussed above. The 3D multi-scale filterbank is used to extend the 2D reconstruction to reconstruct videos using 3D Least-Squares Reconstructions using AM-FM harmonics (3D-LESHA), 3D multi-scale least-squares reconstructions (3D-MULTILES) and 3D Least-Squares Reconstructions using AM-FM harmonics and the DCA (3D-LESCA). 3D-MULTILES will be discussed since the application of 3D-LESCA and 3D-LESHA are similar to the 2D methods.

3D-MULTILES is based on the scales of the filterbanks designed by defining d as the global DC image estimate, $G(k_1,k_2,k_3)$ as the low pass filter output, $a_1 \cos \phi_1$ f as the high-frequency scale AM-FM component, $a_2 \cos \phi_2$ as the medium frequency scale AM-FM component, and $a_3 \cos \phi_3$ as the low-frequency scale AM-FM component. In this case, least squares reconstructions is given by:

$$\hat{I}(k_1, k_2, k_3) \approx d + c_0 G(k_1, k_2, k_3) + \sum_{n=1}^{s} c_n a_n(k_1, k_2, k_3) \cos(\varphi_n(k_1, k_2, k_3)),$$

where s is the number of scales used.

The AM-FM multi-scale coefficients $c_n$, n=0, 1, . . . , s are computed, so that $\hat{I}(k_1,k_2,k_3)$ is a least-squares estimate of $I(k_1,k_2,k_3)$. An orthonormal basis is also computed over the space of the AM-FM estimations scale by scale.

It is important to note that adding decomposition levels also reduces the total amount of video signal energy that is captured by the decomposition. For a single scale decomposition, video signal energy is captured by the low-pass filter component and the dominant high-frequency components, selected from the high frequency 3D bandpass filters. Then, in two-scale decompositions, the 3D spectrum captured by the low-pass filter is further decomposed into two new scales. The dominant components are found in this second scale while the lowest frequency components are captured by the new low-pass filters. Similarly, for three-scales, decompose the frequency spectrum of the 3D low-pass filter is decomposed.

The extracted dominant components from each scale provide decompositions using an independent AM-FM component per scale. Furthermore, the corresponding dominant channel filters allow the extraction of local spatiotemporal content over each pixel. This approach allows the re-formulation of the classical motion estimation problem with several independent equations over each scale. It is also important to note that the AM-FM decomposition also track both continuous and discontinuous motions since at every pixel three different dominant channels from three different scales can be associated.

For the 3D-LESHA reconstruction method, reconstructing the input video using AM-FM harmonics is considered:

$$\hat{I}(k_1, k_2, k_3) \approx d + \sum_{n=1}^{h} c_n a(k_1, k_2, k_3) \cos(n\varphi(k_1, k_2, k_3)),$$

where d is a scalar and h is the maximum number of AM-FM harmonics to use. For 3D-LESCA, $G((k_1,k_2,k_3)$ (the LPF output) is also used. Thus, least squares video reconstructions is considered using:

$$\hat{I}(k_1, k_2, k_3) \approx d + c_0 G(k_1, k_2, k_3) + \sum_{n=1}^{h} c_n a(k_1, k_2, k_3) \cos(n\varphi(k_1, k_2, k_3)).$$

VS-LLP provides for significant improvement in instantaneous frequency estimation, while the least-squares AM-FM decompositions can be used to reconstruct general images.

For both instantaneous amplitude and instantaneous frequency estimations, significant improvements are realized when using the multi-scale filterbanks. Instantaneous frequency estimation does suffer when the instantaneous frequency components are very low. This comes from the requirement that the AM and FM magnitude spectra should remain clearly separated.

For instantaneous frequency estimation, VS-LLP is consistently shown to improve estimation over all other methods for single-component signals, without the use of filterbanks. Similarly, for the same signal, significant improvements are obtained over regularized AM-FM demodulation. Dramatic improvements in instantaneous frequency estimation are seen when using VS-LLP with modulation to a lower frequency. Here, modulating to a lower frequency has the effect of "slowing-down" the signal, allowing the consideration of instantaneous frequency estimation algorithms with spacings of 1 to 4 pixels. In turn, this "slow-down" helps the local linear phase model become more applicable. The use of post and pre filtering with a 3×3 median filter also helps reduce noise. Again, the advantage of the median filter is that it removes noise without reducing the bandwidth (for single AM-FM components only).

It is also interesting to note the 70 dB improvement over QEA, when the Quadrature signal was provided to both VS-LLP and the QEA, which suggests that most of the error comes from estimating the Quadrature signal. When the Quadrature signal is provided, the VS-LLP is directly compared to the standard QEA, without accounting for any pre-processing.

To analyze the results for image reconstructions, it is important to note the significant role played by the channel filters in each scale. For example, for a single-scale, the spectral support for the LPF is the largest. Similarly, for three-scale reconstructions, the LPF support is the smallest. Thus, in considering the quality of the reconstructions, given the fact that most image energy is concentrated around the lower-frequency components, the LPF provides a very significant contribution. This also applies to LESHA reconstructions since the low-frequency components estimated over the LPF will dominate. For LESHA, the use of AM-FM harmonics did not contribute much to the reconstruction. This result is attributed to the fact that low-frequency components, estimated over the LPF, dominate the reconstruction.

For LESHA and MULTILES, AM-FM demodulation is not allowed over the LPF. This allows the measurement of the contribution of higher-frequency AM-FM components. It is clear that the use of AM-FM components extracted from multiple scales provided for the most significant AM-FM contributions towards the reconstruction.

The success of the VS-LLP algorithm comes from the fact that it adaptively selects accurate instantaneous frequency estimates at every pixel. Here, the basic idea is to look at instantaneous frequency estimates coming from different spacings between the samples, and then select the estimate that also produces the lowest condition number estimate. It has been verified experimentally that the instantaneous frequency methods that produced lower condition number estimates have also produced more accurate demodulation results. Overall, this resulted from the fact that numerical stability of the instantaneous frequency estimate was considered a function of frequency. It thus makes sense to consider samples separated by larger distances for lower frequencies as opposed to using smaller distances for higher frequencies.

The accuracy of the multi-scale QEA amplitude estimates are attributed to the relatively flat spectral magnitude response of the designed digital filters. The use of non-flat magnitude response will clearly alter the AM-FM component spectrum dramatically. Apparently, it is far more efficient to use digital filters with flat responses, instead of attempting to fix for the non-flat response afterwards.

The use of a robust least-squares approach for combining AM-FM components is an important step that directly leads to accurate reconstructions of general images. In other words, the standard use of dominant component analysis does produce AM-FM components that are (generally) far from orthogonal. Use of a least-squares approach relaxes the assumption that the demodulated AM-FM components should be orthogonal.

In sum, the first step in developing the AM-FM methods according to the present invention is to design a new multi-scale filterbank. This design allows correct instantaneous frequency component sign estimation. The almost flat response in the bandpass frequency of the 1D filters eliminates errors due to the use of an amplitude correction as in the case of using Gabor filterbanks. The use of these filters in the AM-FM demodulation problem produces big improvements in the instantaneous amplitude estimations and instantaneous frequency estimations. For noisy signals, VS-LLP produced better results for robust instantaneous frequency estimation than previous methods such as QEA or QLM.

Images can be reconstructed based on their instantaneous amplitude and instantaneous phase information. The least squares methods MULTILES, LESHA and LESCA produced good image reconstructions and MULTILES showed that AM-FM components from different scales of the frequency spectrum contain important information that can be used to improve image quality in the reconstruction. Overall, the present invention provides for accurate reconstructions of general images and the extraction of AM-FM component parameters. Clearly, all prior applications that were based on AM-FM demodulation can benefit from using the new filterbanks presented.

As for 2D, the first step was to design new 3D multi-scale filterbanks with support in four octants of the frequency spectrum. Similar to the 2D case, the flat response in the bandpass frequency of the 1D filters eliminate errors due to the use of an amplitude correction as in the case of using Gabor filterbanks. Basically, the 2D AM-FM formulation and theory is extended to 3D.

Video reconstructions can be obtained using AM-FM from multiple-scales in three different forms based on the 2D methods. These AM-FM methods can be used for motion estimation, allowing the estimation of pixel motion with up to three equations per pixel per scale (AM, FM, and continuity equations). The new filterbanks cover the entire frequency spectrum providing dense motion estimates.

Figure 8:
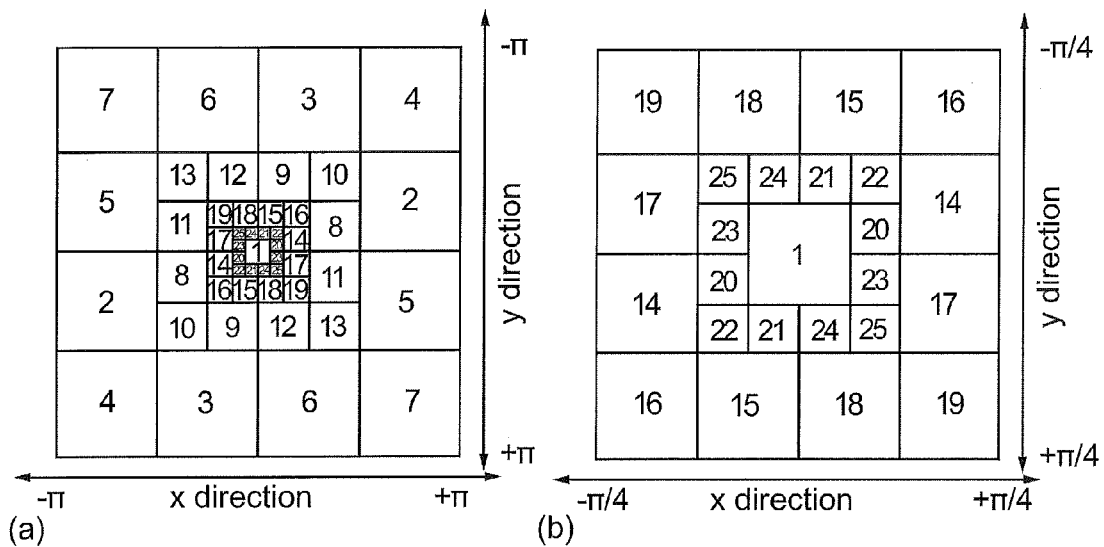
FIG. 8 illustrates a four-scale filterbank used for retinal image analysis with (a) representing a complete frequency spectrum of the filterbank and (b) representing zoom on the low frequency bandpass filters according to the present invention.

One application of the present invention will now be discussed with respect to retinal image analysis using AM-FM methods. For retinal image analysis, a four-scale filterbank was designed as shown by FIG. 8. In FIG. 8, filter 1 corresponds to a low pass filter ("LPF") with frequency support $[-\pi/16, \pi/16]$ for both x and y directions. For all the other filters, the bigger the label number of the filter, the lower the frequency support that it has. The filters in the highest frequencies, such as filters from 2 to 7, have a bandwidth of $\pi/2$ for both x and y directions. The bandwidth is decreased by a factor of 0.5 for each added scale. FIG. 8(a) illustrates a complete frequency spectrum of the filterbank and FIG. 8(b) illustrates the zoom on the low frequency bandpass filters.

AM-FM components are extracted from different scales. Table 3 describes the correspondence between the scales and bandpass filters according to one embodiment:

TABLE 3

Bandpass filters used for estimating AM-FM in a four-scale filterbank

| Scales | | Bandpass filters |
|---|---|---|
| LPF | Low pass filter | 1 |
| VL | Very low frequencies | 20, 21, 22, 23, 24, 25 |
| L | Low frequencies | 14, 15, 16, 17, 18, 19 |
| M | Medium frequencies | 8, 9, 10, 11, 12, 13 |

As shown by Table 4 below, nine different cases of extracting dominant AM-FM component from different scales is considered for retinal applications:

TABLE 4

Scales used for the nine cases in retinal image analysis

| Case # | Scales used for AM-FM estimation | AM-FM component |
|---|---|---|
| 1 | VL, L, M | $a_1 \cos \phi_1$ |
| 2 | LPF | $a_2 \cos \phi_2$ |
| 3 | VL | $a_3 \cos \phi_3$ |
| 4 | L | $a_4 \cos \phi_4$ |
| 5 | M | $a_5 \cos \phi_5$ |
| 6 | LPF, VL, L, M | $a_6 \cos \phi_6$ |
| 7 | LPF, VL | $a_7 \cos \phi_7$ |
| 8 | VL, L | $a_8 \cos \phi_8$ |
| 9 | L, M | $a_9 \cos \phi_9$ |

From each case i, i=1, . . . , 9, histograms of both the instantaneous amplitude $a_i$ and the magnitude of the instantaneous frequency $(\nabla \phi_i)$ given by $\|\nabla \phi_i\|$ as image features are used. It should be noted that high-frequency bandpass filters (filters from 2 to 7 of FIG. 8) are not used for the analysis because the information contained therein is the high frequency noise of the image.

The histograms of instantaneous amplitude and the magnitude of the instantaneous frequency, $\|IF\|$, are used to create a feature vector for detection of diabetic retinopathy ("DR"). Using histograms at different scales (see Table 4) the information extracted with AM-FM can be analyzed to find differences among retinal images with DR and healthy images. A region containing micro-aneurysms, hemorrhages, and exudates will have different estimates for instantaneous amplitude than a region lacking these features. Using these histograms, it can be found if a certain frequency component that encodes a feature is present in the image.

Both histograms, of $a_i$ and $\|\nabla \phi_i\|$, for i=1, 2, . . . or 9, are computed using forty bins, leading to one histogram of eighty bins. Histograms are computed for each image at all nine filterbank cases and analyzed separately. Thus, each image has nine histograms, one per filterbank case.

A predictor of disease state can be developed based on the histogram bins counts generated. The dependent variable, disease state, is coded with 0's for normal and 1's for the disease state. The normal images are separately compared with disease Risks 1, 2 and 3. Thus, three cases are considered: 0 versus 1, 0 versus 2 and 0 versus 3.

Each of the nine cases for estimating the AM-FM features (see Table 4) has an 80-bin histogram. A joined histogram vector containing the histogram of the nine cases is created. Thus, 9 cases×80 bins each=720 bins used for each image. This number is reduced by first solving the detection problem for each filter case, then combining the nine detectors into one. The regression model is given by:

$$Y = X\beta + \epsilon,$$

where Y is the vector of diagnoses such as 0's and 1's for normal and diseased, X is the matrix of independent variables (bin counts of instantaneous amplitude and $\|IF\|$ histograms), $\beta$ is the vector of weights and $\epsilon$ is a vector of random errors. The Gauss-Markov theorem assures that the least-squares estimate of $\beta$ given by the so called normal equations:

$$\hat{\beta} = (X'X)^{-1}X'Y$$

is the Best Linear Unbiased Estimator ("BLUE") of $\beta$ and hence the BLUE of Y as given by $\hat{Y} = X\hat{\beta}$.

A number of methods referred to as shrinkage methods exist that forgo the unbiased criterion that may exist and decrease the variance more than the loss of accuracy due to some added bias. One shrinkage method that is in common use is Principal Components Regression ("PCR"). PCR is based on Principal Components Analysis ("PCA") which factors the n×p matrix X into two parts:

$$X = TL,$$

where the matrix T is an orthogonal matrix of size n×p containing the p principal components and L is a p×p matrix of loading factors. The advantage of PCA is that the principal components are ordered in their ability to reconstruct X. That is X can be approximated parsimoniously by the first columns of T and rows of L. This leads to a reduction of the regression problem called PCR:

$$X \approx T_1 L_1$$

$$Y = X\beta + \epsilon \approx T_1(L_1\beta) + \epsilon = T_1\gamma + \epsilon,$$

where now the number of variables has been reduced from p to the number of columns of $T_1$ and the multi-colinear columns of X have been replaced by the uncorrelated columns of $T_1$.

The difficulty of PCR is that in the linear regression application it is the wrong optimization. PCA is based only on the covariance of the columns of X. In the regression problem, it is the covariance of X with Y that is of concern rather than the columns of X with themselves. While the first columns of the T matrix frequently will serendipitously have all of the information on Y contained in X, numerous applications have been incurred where the first columns of T contained only information about X with the information about Y being in the eigenvectors corresponding to the smaller eigenvalues, i.e., the later columns of T. In that case, PCR misses the information X contains about Y completely.

A second shrinkage method very similar to PCR solves the problem discussed in the previous paragraph. The method, called Partial Least Squares ("PLS"), factors the X matrix exactly like PCA, only while PCA optimally explains the covariance of the columns of X with themselves, the PLS optimization explains the covariance of the columns of X with Y as parsimoniously as possible. PLS results in a T matrix of so called latent factors which are orthogonal, and the first columns $T_1$ use as few columns as possible to explain the variability of Y. PLS is used in the analysis of the data and predictions of diagnoses.

When a model is fit to a data set using any of the methods discussed above, the predictor is then applied to that data set to assess the accuracy of the predictor. It is inevitable that when the model is used to make predictions for a new data set not used in the construction of the model, the accuracy is not as good. The difference between the two predictions is referred to as the optimism of the model. Several methods are used to minimize the optimism, one such method being the jackknife, or leave-one-out method.

The concept of the jackknife is to serially remove each case of the data, fit the model without that case, and then predict the y value for that case using the model. What this is accomplishing is to make predictions using models that were not constructed using the case being predicted. The algorithm is summarized as:

For i=1 to n
  $X_i$=X with the $i^{th}$ row removed.
  $Y_i$=Y with the $i^{th}$ element removed.
  Fit the model $Y_i$ and $X_i$.
  Predict the $i^{th}$ value of Y using the $i^{th}$ row of X.
  Accumulate the sum of the squared prediction errors.
end Using this algorithm a less optimistic prediction error can be constructed. This algorithm and other variants of it are used to assess all results.

The dependent variable—disease state—is coded with 0's for normal and 1's for the disease state. The normal images are separately compared with disease Risks 1, 2 and 3. For each of the nine cases (see Table 4), histograms of the instantaneous amplitude and magnitude of the instantaneous frequency, $\|IF\|$, are generated for every image—a total of 720 histogram bins for each image. This number is reduced by first solving the detection problem for each case, then combining the nine detectors into one.

The first step was to develop a robust estimator for each case. To accomplish this, each case was analyzed separately fitting PLS models with 2 to 20 latent factors. In each combination, a jackknife estimate of the predictors was constructed and the area under the Receiver Operating Characteristic ("ROC") curve ("AUC") estimated using these predictions. Jackknifed predictions are used for robustness. The number of latent factors giving the highest AUC is retained as the optimal number of latent factors for that filter case. To increase the robustness of each model, only cases using 10 or fewer factors are included in the next step since a larger number of factors generally indicate that the model is fitting noise. Table 5 shows the resulting number of latent factors used in the experiments that produced the results which will be described below.

TABLE 5

Number of factors in normal versus risk (1, 2, 3) retinopathy

| Risk 1 | | Risk 2 | | Risk 3 | |
|---|---|---|---|---|---|
| Case | # Factors | Case | # Factors | Case | # Factors |
| 1 | 9 | 1 | 8 | 1 | 8 |
| 2 | 16 | 2 | 4 | 3 | 8 |
| 3 | 7 | 3 | 11 | 3 | 3 |

TABLE 5-continued

Number of factors in normal versus risk (1, 2, 3) retinopathy

| Risk 1 | | Risk 2 | | Risk 3 | |
|---|---|---|---|---|---|
| Case | # Factors | Case | # Factors | Case | # Factors |
| 4 | 18 | 4 | 4 | 4 | 4 |
| 5 | 5 | 5 | 2 | 5 | 9 |
| 6 | 2 | 6 | 4 | 6 | 8 |
| 7 | 16 | 7 | 4 | 7 | 9 |
| 8 | 2 | 8 | 7 | 8 | 10 |
| 9 | 9 | 9 | 3 | 9 | 4 |

For example, in the detection of Risk 1 in the data containing Risk 1 as the only level of retinopathy and Risk 0 (normals), cases 4 and 9 from Table 4 provided the best model for the detection of the Risk 1 patients. These cases appear to indicate that the spatial information, as encoded by the associated scales, serve to differentiate the two classes of images, i.e., normal versus Risk 0. Similarly, one can select appropriate combinations of scale from Table 4 for the detection of the Risk 2 and Risk 3. Likewise, detecting certain lesion types, such as Neovascularization/New Vessels of the Disc ("NVE/NVD"), will be performed using specific scales. Based on this factor-based analysis, the next step is to use the information to produce a matrix of independent variables that is parsimonious, well conditioned and robust. To accomplish this, the data for each case with 10 or fewer factors is used in a PLS model using the optimal number of factors as shown in the tables above. For the normal's versus Risk 1 retinopathy, for example, case 1 was fitted with a PLS model using 9 factors producing a T matrix of t-scores, $T_1$. The case 2, which requires 16 factors, is not fitted since the number of factors is greater than 10. Finally, case 9 is fitted using 9 factors producing a t-score matrix $T_9$. From this, a matrix of independent variables is constructed as:

$$X=[T_1|T_3|T_5|T_6|T_8|T_9].$$

From a regression model, X is constructed from the T matrices. This model was fitted using PLS with 2 factors and jackknifed predictions of the diagnoses obtained. The resulting ROC curves and AUC's estimated from these predictions is discussed below.

Considering the application of AM-FM feature extraction and PLS classification to the four categories of DR severity (0=none; 1=few microaneurysms ("MAs"); and 2=MAs and hemorrhages present, and 3=extensive MAs, hemorrhages, possible macular edema ("MEs") and neovascularization). The sensitivity, specificity, and area under the ROC curve are given for both the testing processes described above. First, the ability to correctly detect those images is determined with signs of DR in a set of images composed of Risk 0 (normal N=92) and Risk 1 (N=71). A total of 163 images are selected from the total available (N=265). AM-FM features are calculated for the nine cases (see Table 4). The PLS-based classifier is tested using all combinations to determine the best model (as measured by AUC).

Figure 9:
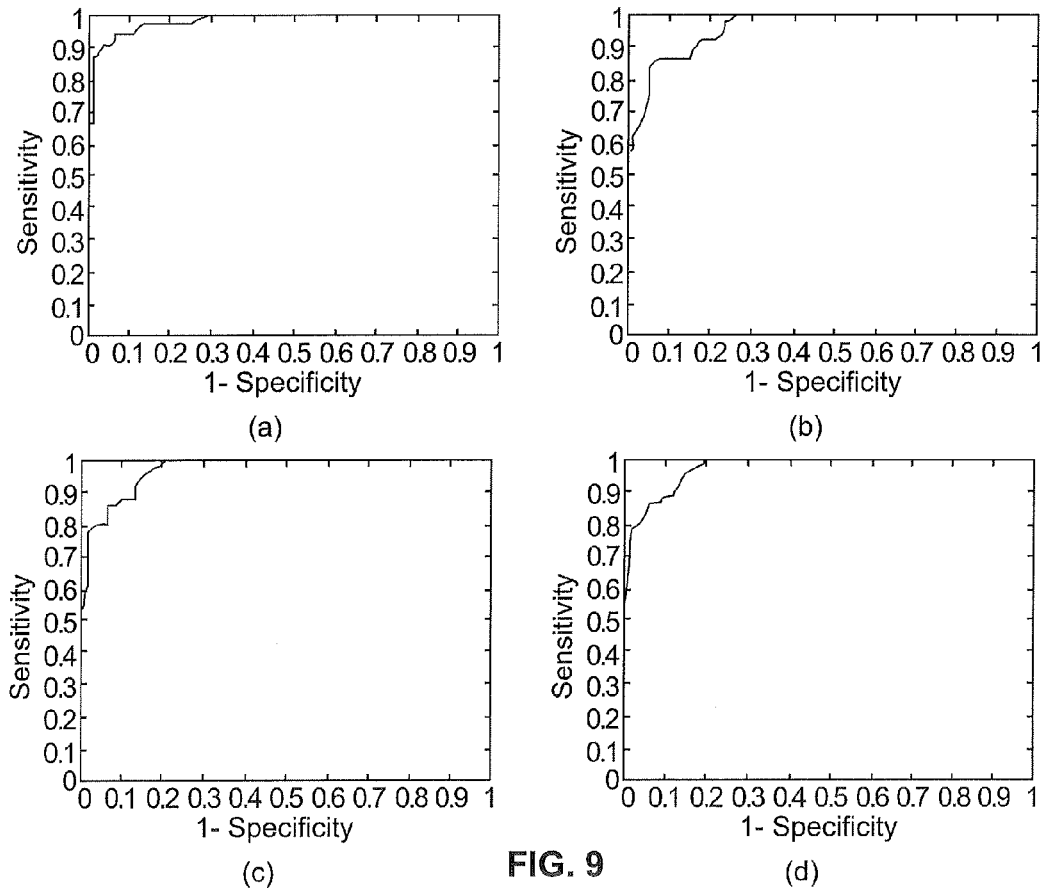
FIG. 9 illustrates Receiver Operating Characteristic for detection of Risk 0 (normal) in a set of normals versus different forms of diabetic retinopathy according to the present invention.

FIG. 9 illustrates Receiver Operating Characteristic for detection of Risk 0 (normal) in a set of normals versus different forms of diabetic retinopathy. More specifically, FIG. 9(a) shows the ROC curve for detecting, classifying and comparing Risk 0 versus Risk 1 images. As shown by FIG. 9a, a sensitivity of 95% with a specificity is 85% is shown. Area under the ROC is 0.984. This data set of 265 includes 4.5% images of less than optimal quality, i.e., worse than image quality grade 3. A sensitivity of 98% and specificity of 93% can be achieved if 4-5% of the worse quality images are removed. FIG. 9(b) shows the ROC curve for detecting, classifying and comparing Risk 0 versus Risk 2 images. As shown by FIG. 9(b), for a sensitivity of 90%, the specificity is 80%. Area under the ROC is 0.95. FIG. 9(c) shows the ROC curve for detecting, classifying and comparing Risk 0 versus Risk 3 images. FIG. 9(c) shows a sensitivity of 100%, and a specificity of 82%. Area under the ROC is 0.973. Finally, FIG. 9(d) shows the ROC curve for detecting, classifying and comparing Risk 0 versus all patients with any form of DR, which shows a sensitivity of 100%, specificity of 82% and an area under the ROC equal to 0.95.

Now the application of AM-FM/PLS processing to images sets with vascular abnormalities and risk for macular edema (DR level 3 and macular edema level 2) is considered. Also, the effects of image quality are addressed. Table 6 shows the distribution of image quality for 265 test images with higher values indicating better image quality:

TABLE 6

Distribution of image quality by Risk level

| | | Image Quality | | | | |
|---|---|---|---|---|---|---|
| Risk | Total | 1 | 2 | 3 | 4 | 5 |
| 0 | 92 | 2 | 3 | 5 | 43 | 39 |
| 1 | 71 | 0 | 1 | 4 | 37 | 29 |
| 2 | 50 | 0 | 3 | 9 | 23 | 15 |
| 3 | 52 | 0 | 3 | 6 | 36 | 7 |

Here, 36 images are combined from Risks 2 and 3 with risk of macular edema and 11 images with vascular abnormalities are separated from them resulting in 100% of these images being correctly classified.

Figure 10:
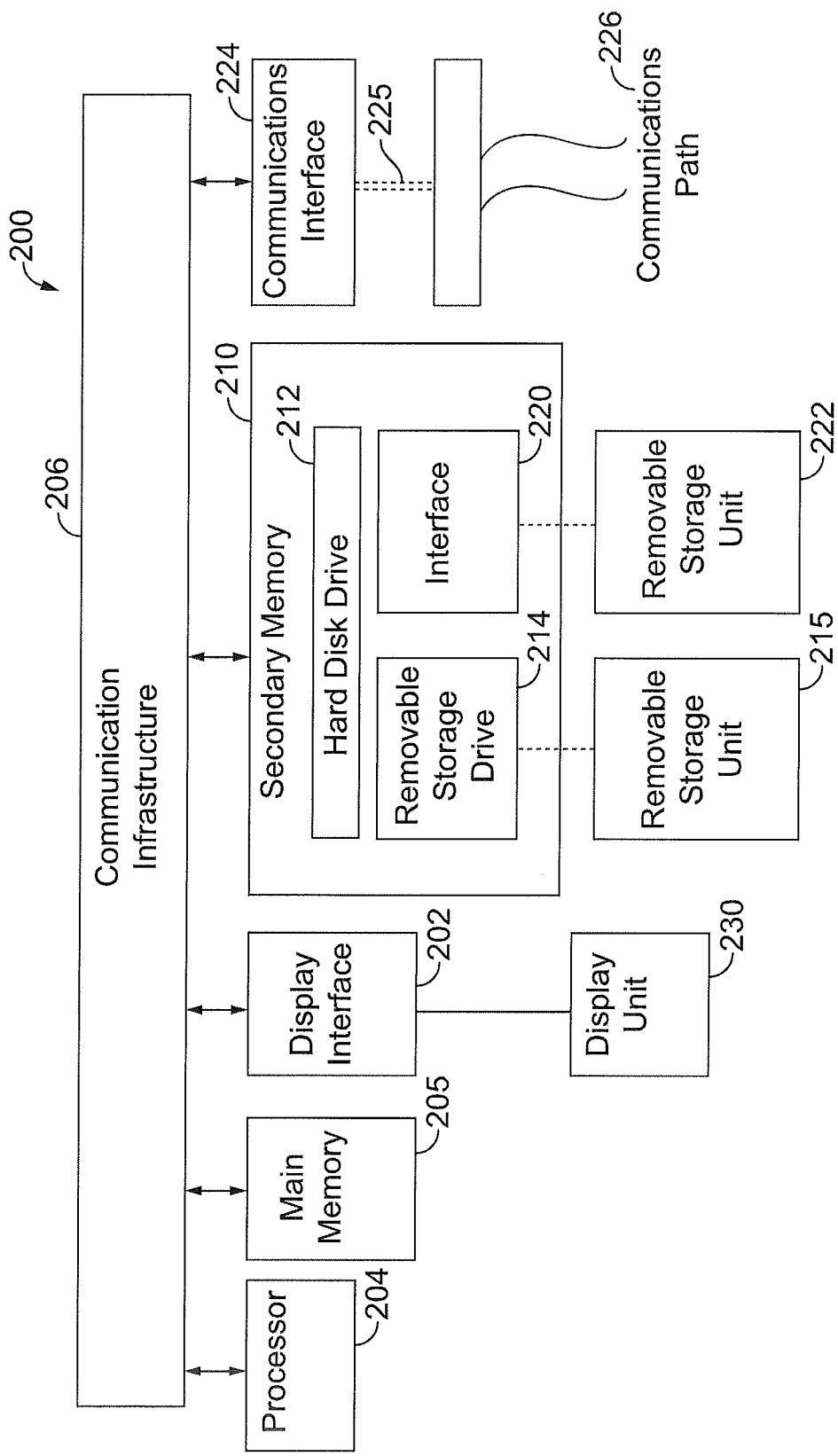
FIG. 10 illustrates a block diagram of an exemplary computer system for implementing the methods according to the present invention.

FIG. 10 illustrates an exemplary computer system 200, or network architecture, that may be used to implement the methods according to the present invention. One or more computer systems 200 may carry out the methods presented herein as computer code. One or more processors, such as processor 204, which may be a special purpose or a general-purpose digital signal processor, is connected to a communications infrastructure 206 such as a bus or network. Computer system 200 may further include a display interface 202, also connected to communications infrastructure 206, which forwards information such as graphics, text, and data, from the communication infrastructure 206 or from a frame buffer (not shown) to display unit 230. Computer system 200 also includes a main memory 205, for example random access memory ("RAM"), read-only memory ("ROM"), mass storage device, or any combination thereof. Computer system 200 may also include a secondary memory 210 such as a hard disk drive 212, a removable storage drive 214, an interface 220, or any combination thereof. Computer system 200 may also include a communications interface 224, for example, a modem, a network interface (such as an Ethernet card), a communications port, a PCMCIA slot and card, wired or wireless systems, etc.

It is contemplated that the main memory 205, secondary memory 210, communications interface 224, or a combination thereof function as a computer usable storage medium, otherwise referred to as a computer readable storage medium, to store and/or access computer software and/or instructions.

Removable storage drive 214 reads from and/or writes to a removable storage unit 215. Removable storage drive 214 and removable storage unit 215 may indicate, respectively, a floppy disk drive, magnetic tape drive, optical disk drive, and a floppy disk, magnetic tape, optical disk, to name a few.

In alternative embodiments, secondary memory 210 may include other similar means for allowing computer programs or other instructions to be loaded into the computer system 200, for example, an interface 220 and a removable storage unit 222. Removable storage units 222 and interfaces 220 allow software and instructions to be transferred from the removable storage unit 222 to the computer system 200 such as a program cartridge and cartridge interface (such as that found in video game devices), a removable memory chip (such as an EPROM, or PROM) and associated socket, etc.

Communications interface 224 allows software and instructions to be transferred between the computer system 200 and external devices. Software and instructions transferred by the communications interface 224 are typically in the form of signals 225 which may be electronic, electromagnetic, optical or other signals capable of being received by the communications interface 224. Signals 225 are provided to communications interface 224 via a communications path 226. Communications path 226 carries signals 225 and may be implemented using wire or cable, fiber optics, a phone line, a cellular phone link, a Radio Frequency ("RE") link or other communications channels.

Computer programs, also known as computer control logic, are stored in main memory 205 and/or secondary memory 210. Computer programs may also be received via communications interface 224. Computer programs, when executed, enable the computer system 200, particularly the processor 204, to implement the methods according to the present invention. The methods according to the present invention may be implemented using software stored in a computer program product and loaded into the computer system 200 using removable storage drive 214, hard drive 212 or communications interface 224. The software and/or computer system 200 described herein may perform any one of, or any combination of, the steps of any of the methods presented herein. It is also contemplated that the methods according to the present invention may be performed automatically, or may be invoked by some form of manual intervention.

The invention is also directed to computer products, otherwise referred to as computer program products, to provide software to the computer system 200. Computer products store software on any computer useable medium. Such software, when executed, implements the methods according to the present invention. Embodiments of the invention employ any computer useable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, Micro-Electro-Mechanical Systems ("MEMS"), nanotechnological storage device, etc.), and communication mediums (e.g., wired and wireless communications networks, local area networks, wide area networks, intranets, etc.). It is to be appreciated that the embodiments described herein can be implemented using software, hardware, firmware, or combinations thereof.

The computer system 200, or network architecture, of FIG. 10 is provided only for purposes of illustration, such that the present invention is not limited to this specific embodiment. It is appreciated that a person skilled in the relevant art knows how to program and implement the invention using any computer system or network architecture.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

What is claimed is:

1. A computer system method for modeling image content comprising the steps of:
   providing an input image;
   computing a two-dimensional extended analytic signal of the input image;
   selecting a multi-scale filterbank by defining one or more bandpass filters that correspond to each scale of the multi-scale filterbank;
   processing the two-dimensional extended analytic signal through the multi-scale filterbank;
   calculating estimates for instantaneous amplitude, instantaneous phase, and instantaneous frequency, said calculating step further comprising the step of applying a Variable Spacing Local Linear Phase Model;
   selecting the instantaneous amplitude estimate with the maximum amplitude response, the instantaneous phase estimate with the maximum phase response, and the instantaneous frequency estimate with the maximum frequency response from said calculating step;
   reconstructing the input image using the instantaneous amplitude estimate and instantaneous frequency estimate from said selecting step to obtain a reconstructed image; and
   displaying the reconstructed image on a display unit.

2. The computer system method for modeling image content of claim 1 wherein said applying step further comprises the steps of:
   selecting the instantaneous frequency estimate with the minimum value for a condition number;
   pre-filtering the instantaneous frequency estimate with a median filter;
   post-filtering the instantaneous frequency estimate with the median filter; and
   modulating high-frequency outputs to baseband, wherein the Variable Spacing Local Linear Phase Model is directly applicable.

3. The computer system method for modeling image content of claim 1 wherein the multi-scale filterbank includes the one or more bandpass filters that have been optimally designed using min-max criteria.

4. The computer system method for modeling image content of claim 1 wherein said reconstructing step further includes the step of:
   figuring the instantaneous amplitude estimate and the instantaneous frequency estimate for each scale of the multi-scale filterbank to obtain computed estimates.

5. The computer system method for modeling image content of claim 1 wherein the method is applied to images identifying of disease at different stages.

6. The computer system method for modeling image content of claim 1 wherein the method is applied to retinal image analysis.

7. The computer system method for modeling image content of claim 6 wherein the retinal image analysis further includes diabetic retinopathy classification.

8. The computer system method for modeling image content of claim 1 wherein the method is applied to processing X-ray images.

9. The computer system method for modeling image content of claim 1 wherein the method is applied to describing images featuring atherosclerotic plaque.

10. A computer system method for modeling video content comprising the steps of:
- providing an input video;
- computing a three-dimensional extended analytic signal of the input video;
- selecting a multi-scale filterbank by defining one or more bandpass filters that correspond to each scale of the multi-scale filterbank;
- processing the three-dimensional extended analytic signal through the multi-scale filterbank;
- calculating estimates for instantaneous amplitude, instantaneous phase, and instantaneous frequency, said calculating step further comprising the step of applying a Variable Spacing Local Linear Phase Model;
- selecting the instantaneous amplitude estimates with the maximum amplitude response, the instantaneous phase estimate with the maximum phase response, and the instantaneous frequency estimate with the maximum frequency response from said calculating step;
- reconstructing the input video using the instantaneous amplitude estimate and instantaneous frequency estimate from said selecting step to obtain a reconstructed video; and
- displaying the reconstructed video on a display unit.

11. The computer system method for modeling video content of claim 10 wherein said applying step further comprises the steps of:
- Selecting the instantaneous frequency estimates with the minimum value for a condition number;
- pre-filtering the instantaneous frequency estimate with a median filter;
- post-filtering the instantaneous frequency estimate with the median filter; and
- modulating high-frequency outputs to baseband, wherein the Variable Spacing Local Linear Phase Model is directly applicable.

12. The computer system method for modeling video content of claim 10 wherein the multi-scale filterbank includes the one or more bandpass filters that have been optimally designed using min-max criteria.

13. The computer system method for modeling video content of claim 10 wherein said reconstructing step further includes the step of:
- figuring the instantaneous amplitude estimate and the instantaneous frequency estimate scale by for each scale of the multi-scale filterbank to obtain computed estimates.

14. The computer system method for modeling video content of claim 10 wherein the method is applied to images identifying disease at different stages.

15. The computer system method for modeling video content of claim 10 wherein the method is applied to retinal image analysis.

16. The computer system method for modeling video content of claim 15 wherein the retinal image analysis further includes diabetic retinopathy classification.

17. The computer system method for modeling video content of claim 10 wherein the method is applied to processing X-ray images.

18. The computer system method for modeling video content of claim 10 wherein the method is applied to describing images featuring atherosclerotic plaque.

* * * * *

UNITED STATES PATENT AND TRADEMARK OFFICE
CERTIFICATE OF CORRECTION

PATENT NO. : 8,515,201 B1  
APPLICATION NO. : 12/586276  
DATED : August 20, 2013  
INVENTOR(S) : Victor Manuel Murray Herrera et al.

Page 1 of 1

It is certified that error appears in the above-identified patent and that said Letters Patent is hereby corrected as shown below:

In the Specification

Column 1, line 16, "FA9453-06-C-0211 awarded by DARPA" should read -- FA945306-C-0211 awarded by the United States Air Force --

Signed and Sealed this  
Twenty-first Day of April, 2015

Michelle K. Lee  
*Director of the United States Patent and Trademark Office*